S. J. SILL.
MACHINE FOR APPLYING WRAPPERS TO RUBBER HOSE.
APPLICATION FILED JAN. 8, 1908.
910,871.
Patented Jan. 26, 1909.
3 SHEETS—SHEET 2.
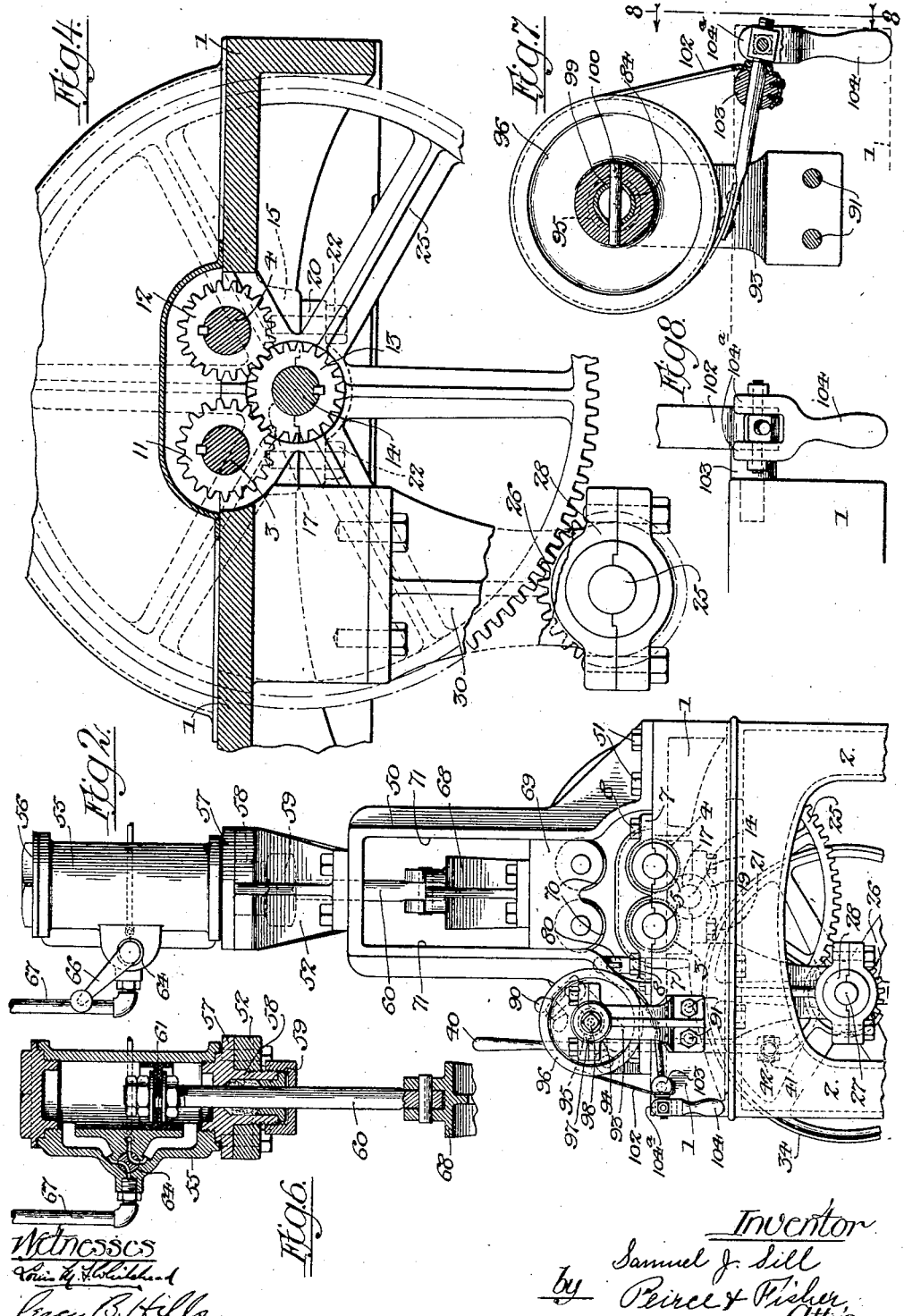

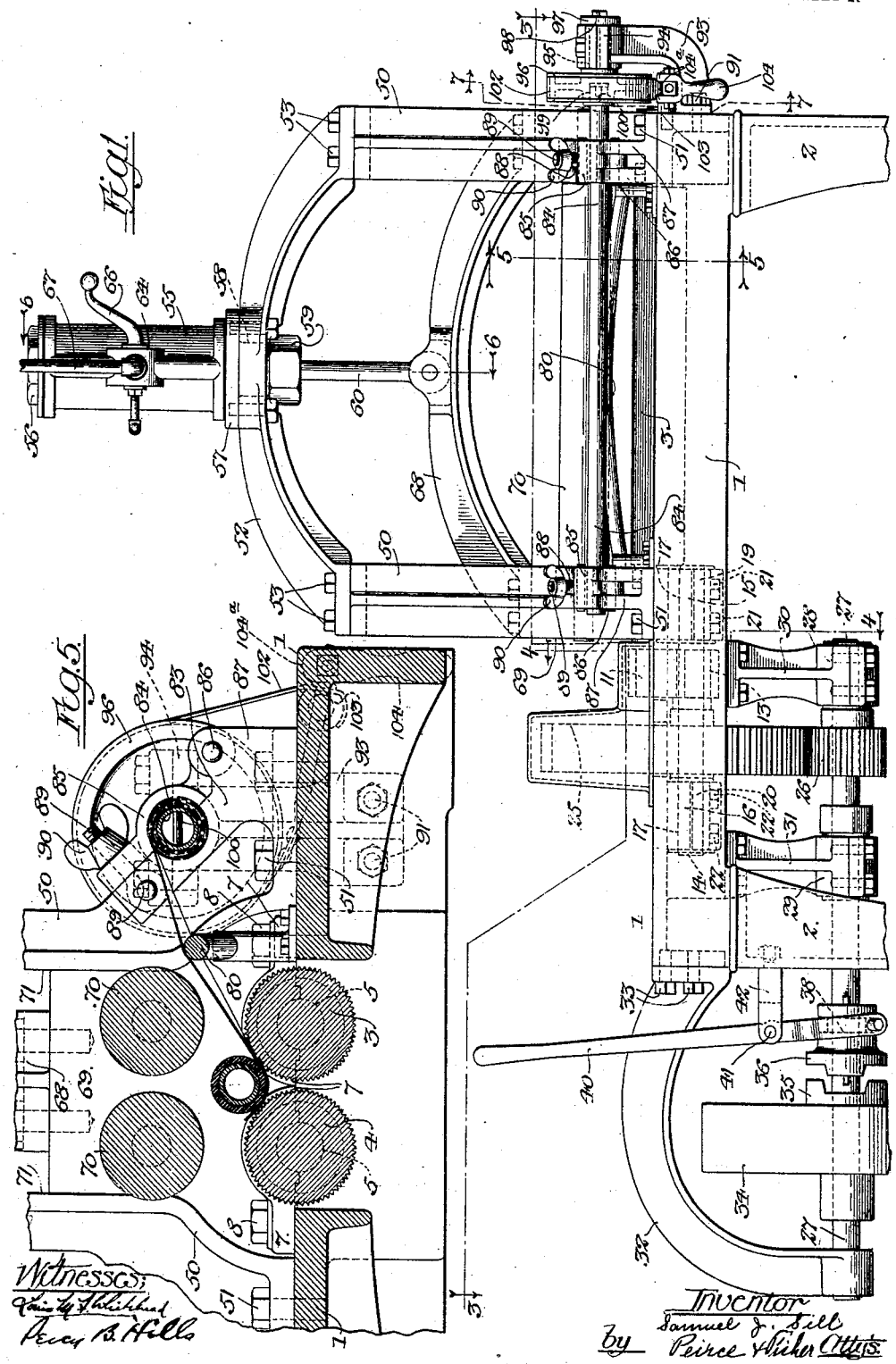

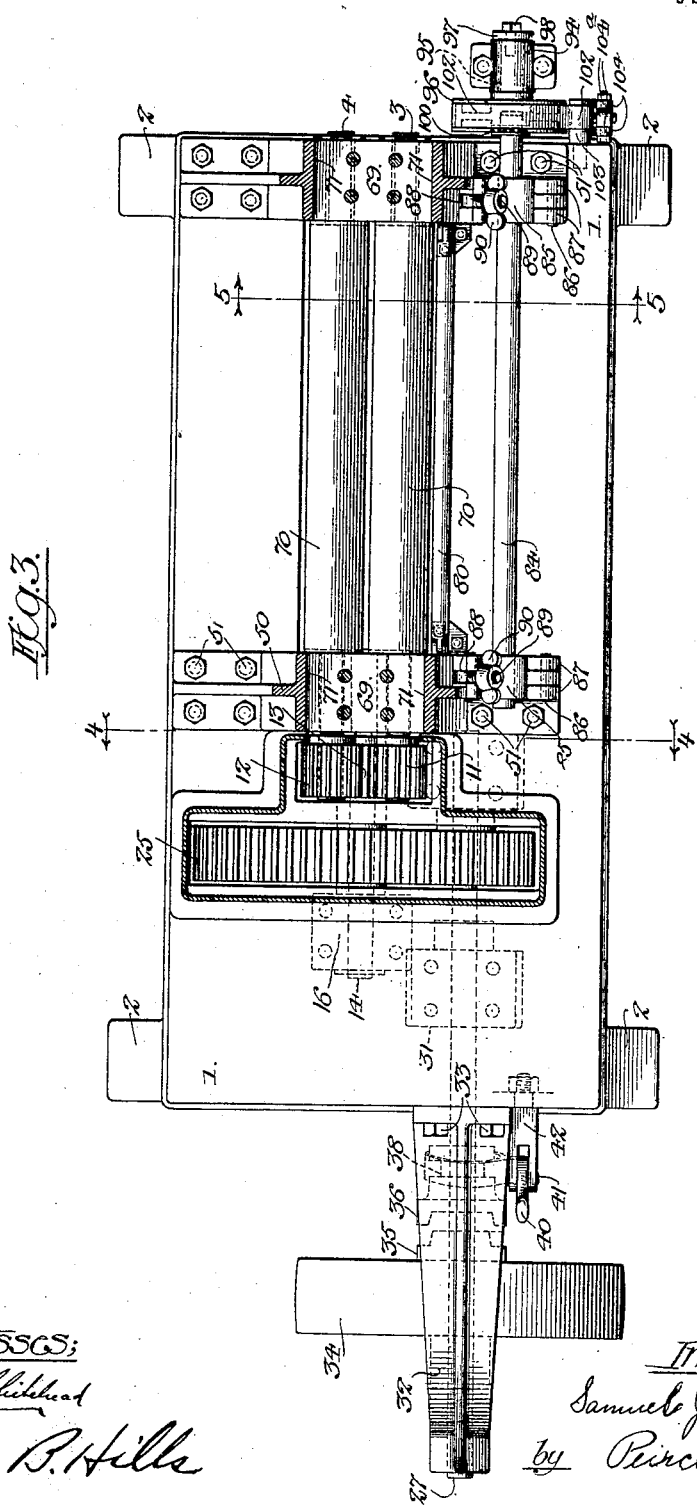

UNITED STATES PATENT OFFICE.

SAMUEL J. SILL, OF BUFFALO, NEW YORK, ASSIGNOR OF ONE-HALF TO HERBERT H. HEWITT, OF BUFFALO, NEW YORK.

MACHINE FOR APPLYING WRAPPERS TO RUBBER HOSE.

No. 910,871.     Specification of Letters Patent.     Patented Jan. 26, 1909.

Application filed January 8, 1908. Serial No. 409,770.

*To all whom it may concern:*

Be it known that I, SAMUEL J. SILL, a citizen of the United States, residing at Buffalo, county of Erie, and State of New York, have invented certain new and useful Improvements in Machines for Applying Wrappers to Rubber Hose, of which I do declare the following to be a full, clear, and exact description, reference being had to the accompanying drawings, forming part of this specification.

In the manufacture of hose, the body of which is formed from frictioned duck or other textile fabric, it is customary to apply to the outer surface of the hose an inclosing sheet or cover of unvulcanized rubber and thereafter to wind about said cover a wet rag or wrapper that is designed to properly hold the rubber cover in place during the subsequent vulcanizing operation to which the hose will be subjected. In order to prevent the formation of creases or like imperfections in the surface of the rubber cover, it is highly important that the wet rags or wrappers shall be smoothly and uniformly applied to the surface of the hose, since any wrinkling of the wrappers must necessarily produce corresponding permanent indentations or imperfections in the rubber cover.

In the drawings, Figure 1 is a front elevation of the improved machine. Fig. 2 is an end view thereof. Fig. 3 is a plan view with parts shown in section on the line 3—3 of Fig. 1. Figs. 4 and 5 are detail sections on lines 4—4 and 5—5 respectively of Figs. 1 and 3. Fig. 6 is a detail section of the operating cylinder. Figs. 7 and 8 are detail views of the friction brake mechanism.

The bed-plate 1 of the machine is supported upon suitable legs 2 at the ends thereof. Within an opening in plate 1 are mounted a pair of bottom or driving rolls 3 and 4, these rolls are preferably fluted and are journaled in suitable bearings. As shown, the bed-plate is formed with recesses 5 to receive the journals at the outer ends of the rolls 3 and 4 and the journals at the opposite ends of these rolls are mounted in similar recesses of the bed-plate. Over the journals at the outer ends of the bottom rolls 3 and 4 set the bearing caps 7 that are bolted as at 8 to the bed-plate, and the journals at the opposite ends of the rolls are retained in place by similar bearing caps that are bolted to the bed-plate. Upon the inner ends of the rolls 3 and 4 are keyed the gear wheels 11 and 12 that mesh with a gear wheel 13 (see Fig. 4) that is mounted upon an intermediate shaft 14. This shaft 14 is journaled in bearings 15 and 16 beneath the bed-plate 1 of the machine, these bearings being preferably formed in part by the cavities 17 on the underside of the bed-plate and in part by the bearing caps 19 and 20 that are bolted as at 21 and 22, respectively, to the underside of the bed-plate. Upon the intermediate shaft 14 is keyed a gear wheel 25 that meshes with a pinion 26 keyed on the main drive shaft 27. This main drive shaft is mounted in suitable bearings 28 and 29 at the lower ends of brackets 30 and 31 that are bolted to the underside of the bed-plate 1.

The outer end of the drive shaft 27 is journaled in a goose-necked bracket 32 that is bolted as at 33 to the end of the bed-plate 1, and upon this drive shaft 27 is loosely mounted the drive pulley 34 having fixed thereto a clutch member 35 adapted to mesh with a corresponding clutch member 36 that is splined upon the drive shaft 27 so as to be moved into and out of engagement with the member 35.

The clutch member 36 is formed with an annular groove 38 to receive studs projecting from the yoke-shaped lower end of a clutch lever 40 that is pivotally mounted as at 41 upon a bracket 42 projecting from the end of the machine, the upper end of this lever forming a handle that extends within easy reach of the operator. It will readily be understood that by means of the clutch lever the drive shaft 27 can be quickly thrown into and out of engagement with the drive pulley 34 that will have rotation imparted thereto from a suitable source of power.

From the top of the bed-plate 1 rise the yoke-shaped standards or brackets 50, the flanged lower ends of which are bolted to the top of the bed-plate as at 51, and across the tops of these standards extends the yoke 52, the ends of which are bolted to the standards as at 53. Upon the top of the yoke 52 is mounted an air cylinder 55, the upper end of which is closed by a head or cap 56 and the lower end of which is closed by a cap or base 57 that has an extension 58 passing through the yoke 52, and the threaded lower end of this extension is provided with a suitable stuffing box 59 through which, and through the base, passes the piston rod 60 that is connected to the piston 61 within the air cylinder 55. The cylinder 55 has at one side thereof a valve chamber 64 containing a valve of any suitable construction for controlling the passage of air to the opposite ends of the cylinder and from this valve extends a stem that is fitted with a hand-lever 66. A pipe 67 for compressed air or other motive fluid leads to the valve chamber 64.

To the lower end of the piston rod is pivotally connected a yoke 68, to the outer ends of which yoke are secured the bearing-blocks 69 in which are journaled the ends of the top rolls 70. The bearing blocks 69 are mounted to slide within the guideways 71 of the standards or brackets 50. By pivotally mounting the yoke 68 to the lower end of the piston rod 60, a rocking motion is allowed to this yoke and to the rolls 70 in order to more uniformly distribute the pressure of the rolls throughout their length. As shown, the top rolls 70 are arranged in juxtaposition and directly above the bottom rolls 3 and 4.

At the front of the machine and extending between the lower portions of the standards or brackets 50 is the guide-bar 80 that is preferably bowed upward, as shown, and over this guide-bar will pass the wet wrappers or rags with which the sections of hose are to be covered. The hose sections to be thus covered will be placed centrally between the pairs of bottom and top rolls.

By reference more particularly to Fig. 5 of the drawings, it will be seen that each of the brackets or standards 50 is formed at its base with a bearing 83 to receive the ends of a mandrel 84 upon which a large number of wet wrappers or rags have been previously wound. The ends of the mandrel 84 will be detachably held within the bearings 83 by means of caps 85 that will be pivotally mounted upon bolts 86 that pass through the reduced front ends of the caps and through perforated lugs 87 rising from the base of the brackets or standards 50. The inner upper ends of the caps 85 will be slotted as at 88 to receive the pivot bolts 89 that will be furnished with wing-nuts 90. It will thus be seen that by loosening the wing-nuts and swinging upward the bolts 89, the caps 85 can be turned forward so as to permit a mandrel to be inserted into or removed from the bearings 83.

At one end of the bed-plate 1 there is bolted as at 91 an upwardly curved bracket 93 that is provided at its top with a bearing 94 to receive the extended journal 95 of a friction wheel 96 and over the outer end of the friction wheel journal 95 and at the end of the bearing box 94 is fitted a cap 97 through which passes a screw bolt 98 that enters a threaded hole formed centrally in the journal 95. The inner face of the hub of the friction wheel 96 is formed with a cavity 99 adapted to receive one end of the mandrel 84 and, as shown, a pin 100 projects through the cavity 99 and enters slots formed in the ends of the mandrel 84 so as to detachably interlock the friction wheel with the mandrel. Around the friction wheel 96 passes a friction band 102, one end of which is connected to a stud 103 and the other end to a handle 104 having cam lugs 104$^a$ thereon whereby the operator will control the friction of the band 102 upon the wheel 96.

In the operation of the machine before the operator places a section of hose, mounted upon a vulcanizing mandrel, in position between the upper and lower pairs of rolls, he will draw partially from off the mandrel 84 one of the wet wrappers and, passing this wrapper over the guide-bar 80, will lay its edge smoothly upon the lower rolls 3 and 4 and then place the hose section thereon as shown in Fig. 5. He will then shift the hand-lever 66 so as to cause the upper rolls 70 to descend and bear upon the hose section. He will next shift the clutch lever 40 so as to cause the main drive shaft to receive rotation from the drive pulley which, through the gear mechanism above described, will impart revolution to the bottom rolls 3 and 4. The bearing of these bottom rolls against the wrapper on the hose section will impart rotation to the hose section and its mandrel and to the top rolls 70 thereby causing the wet wrapper to be drawn off the mandrel 84 and to be laid uniformly around the surface of the hose section. As the wet wrapper is thus being drawn off the mandrel 84, the operator will shift the friction band handle 104 causing the friction band 102 to bind upon the friction wheel 96 thus retarding the rotation of the mandrel 84 that is connected to the friction wheel and placing a tension upon the wet wrapper as it is drawn off the mandrel 84 so as to insure a straining or stretching of the wet wrapper around the surface of the hose section. By this means the operator is enabled not only to tightly wrap the wet wrapper around the hose section but to insure the laying of the wrapper so that no wrinkles shall form therein which would cause permanent imperfections in the surface of the finished hose. When the operator has completely wound one of the wrappers about a hose section, he will withdraw the hose section and its mandrel from between the top and bottom rolls after first lifting the top rolls 70 and he will then substitute another hose section for the one withdrawn and will repeat the operation.

It is obvious that the details set forth may be varied without departure from the essentials of the invention.

Having thus described my invention, what I claim as new and desire to secure by Letters Patent is:

1. In a machine for wrapping hose, the combination with upper and lower rolls between which the hose section to be wrapped will be placed and with means for imparting rotation to said rolls, of means for supporting a wrapper-carrying mandrel and a guide-bar extending lengthwise of the rolls and between them and the mandrel supporting means.

2. In a machine for wrapping hose, the combination with upper and lower rolls between which the hose to be wrapped will be placed and with means for imparting rotation to said rolls, of bearings located in front and at opposite ends of said rolls and means for detachably supporting a wrapper-carrying mandrel in said bearings and parallel with said rolls.

3. In a machine for wrapping hose, the combination with upper and lower rolls between which the hose to be wrapped will be placed, and with means for imparting rotation to said rolls, of bearings located in front and at opposite ends of said rolls for supporting a wrapper carrying mandrel parallel with said rolls, removable caps for said bearings and friction brake mechanism for retarding the rotation of said mandrel.

4. In a machine for wrapping hose, the combination with upper and lower rolls between which the hose to be wrapped will be placed and with means for imparting rotation to said rolls, of means for supporting a wrapper-carrying mandrel, a friction wheel located in juxtaposition to one end of said mandrel and adapted to be connected therewith and means for retarding the movement of said friction wheel and said wrapper-carrying mandrel.

5. In a machine for wrapping hose, the combination with upper and lower rolls between which the hose to be wrapped will be placed and with means for imparting rotation to said rolls, of bearings in front of said rolls for supporting a wrapper-carrying mandrel, a friction wheel located adjacent one end of said mandrel and provided with a cavity to receive said end of the mandrel, a friction band passing around said friction wheel and means for shifting said friction band to retard the rotation of said friction wheel and said mandrel.

SAMUEL J. SILL.

Witnesses:
HARRY L. CLAPP,
KATHARINE GERLACH.